(No Model.)
V. ENGELHARDT & A. NETTEL.
PROCESS OF TREATING METALLIC SULFIDES.
No. 568,843. Patented Oct. 6, 1896.
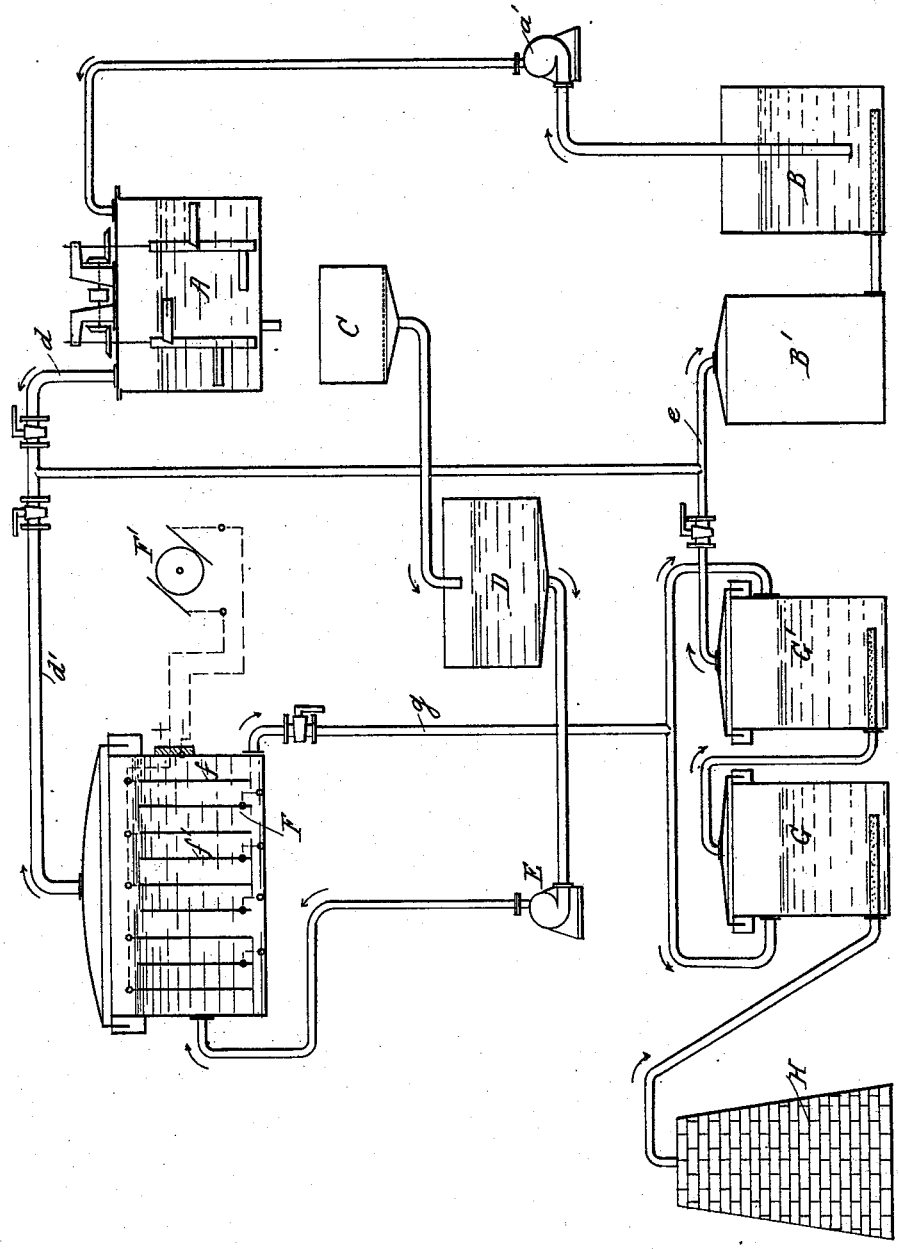

UNITED STATES PATENT OFFICE

VICTOR ENGELHARDT AND ADOLF NETTEL, OF VIENNA, AUSTRIA-HUNGARY.

PROCESS OF TREATING METALLIC SULFIDS.

SPECIFICATION forming part of Letters Patent No. 568,843, dated October 6, 1896.

Application filed April 20, 1896. Serial No. 588,381. (No specimens.)

*To all whom it may concern:*

Be it known that we, VICTOR ENGELHARDT and ADOLF NETTEL, subjects of the Emperor of Austria-Hungary, residing at Vienna, Austria-Hungary, have invented certain new and useful Improvements in the Method for Working Metallic Sulfids; and we do hereby declare the following to be a full, clear, and exact description of the invention, such as will enable others skilled in the art to which it appertains to make and use the same.

This invention relates to the extraction of metals, such as antimony, arsenic, and mercury, from their sulfur compounds; and it consists in the novel process hereinafter fully described and claimed.

The drawing shows a diagram of the apparatus used.

The metallic sulfur compound or sulfid is first treated with a reagent, consisting of a sulfhydrate or a sulfid of one of the alkalies or of one of the alkaline-earth metals in aqueous solution, in order to convert it into a soluble double sulfid. The resulting solution is then decomposed by electrolysis and the metal is obtained in solid form and sulfureted-hydrogen gas is liberated. The spent solution is then treated with carbonic-acid gas. Sulfureted-hydrogen gas is formed and a mixture of sulfur and a carbonate of the reagent is precipitated. The reaction takes place as follows:

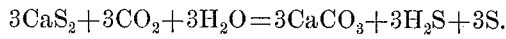

$$3CaS_2 + 3CO_2 + 3H_2O = 3CaCO_3 + 3H_2S + 3S.$$

This precipitate is heated to redness to drive off the sulfur and carbonic-acid gas and recover the oxid of the reagent. The sulfureted-hydrogen gas obtained during the process is collected in any approved manner and is then combined with the oxid thus obtained to form more reagent, and the carbonic-acid gas is used to treat additional quantities of the spent solution.

When the sulfid of antimony is treated and sulfhydrate of calcium is used as the reagent, an aqueous solution of the reagent is first made and the sulfid of antimony is treated with this solution. The resulting solution is then decomposed by electrolysis, forming metallic antimony and liberating sulfureted-hydrogen gas. The spent solution is then treated with carbonic-acid gas. This causes sulfureted-hydrogen gas to be driven off, and a precipitate consisting of a mixture of carbonate of lime and sulfur is formed. This precipitate is heated to redness, forming caustic lime, carbonic-acid gas, and sulfurous-acid gas. The carbonic-acid gas is used to treat additional quantities of spent solution, and the lime and sulfureted-hydrogen gas are utilized to form additional quantities of sulfhydrate of calcium.

The process is substantially the same when the sulfids of arsenic or mercury are treated and when a sulfhydrate or a sulfid of one of the other alkaline-earth metals or alkalies is used instead of sulfhydrate of lime.

A is a tank provided with a stirrer. The ore is treated in this tank with the reagent, which is prepared in the tank B, and is forced into the tank A by means of a pump $a'$.

C is a filter under the tank A for receiving the liquid, which passes thence into a reservoir D.

E is a pump which forces the solution from the reservoir D into the cell F, where it is decomposed by electrolysis.

$F'$ is the electricity-generator.

$f$ are the anodes, and $f'$ are the cathodes.

The spent liquor passes through the pipe $g$ into the vessels G G′ and is treated with carbonic-acid gas obtained by the calcination of limestone in the kiln H. The sulfureted-hydrogen gas is collected from the tank A and cell F, and passes off by the pipes $d$ and $d'$, and is conducted into the pipe $e$ proceeding from the vessel G′. This sulfureted-hydrogen gas is conducted into the tanks B′ and B to form more reagent. The precipitate formed in the vessels G′ G is calcined in the kiln H to form more carbonic-acid gas, and the caustic lime from the kiln is put into the tanks B B′ to assist in forming more reagent.

What we claim is—

The process of treating a metallic sulfur compound, which consists in first converting the said compound into a soluble double sulfid by treating it with any suitable reagent, such as the sulfhydrate of calcium, in aqueous solution; then decomposing the resulting solution by electrolysis to produce the metal and sulfureted-hydrogen gas, then treating the spent solution with carbonic-acid gas to precipitate a carbonate of the base and liberate sulfureted-hydrogen gas, then recovering the oxid of the reagent and the carbonic-acid gas from the precipitate by calcination, then combining the sulfureted-hydrogen gas given off during the process with the said oxid to form more reagent, and using the recovered carbonic-acid gas to treat more spent solution, substantially as set forth.

In testimony whereof we have affixed our signatures in presence of two witnesses.

VICTOR ENGELHARDT.
ADOLF NETTEL.

Witnesses:
HARRY BELMONT,
JOSEF LEHEM.